United States Patent
Partelpoeg

(10) Patent No.: US 8,070,850 B2
(45) Date of Patent: Dec. 6, 2011

(54) PROCESS FOR LIBERATING METALS USING DIRECT PRODUCTION OF LEACH GRADE ACID SOLUTIONS

(75) Inventor: Eric H. Partelpoeg, Tucson, AZ (US)

(73) Assignee: E H P Technology, LLC, Tuscon, AZ (US)

( * ) Notice: Subject to any disclaimer, the term of this patent is extended or adjusted under 35 U.S.C. 154(b) by 363 days.

(21) Appl. No.: 12/246,250

(22) Filed: Oct. 6, 2008

(65) Prior Publication Data

US 2009/0178512 A1    Jul. 16, 2009

Related U.S. Application Data

(60) Provisional application No. 61/010,755, filed on Jan. 11, 2008, provisional application No. 61/060,872, filed on Jun. 12, 2008.

(51) Int. Cl.
C22B 15/00 (2006.01)

(52) U.S. Cl. ............... 75/711; 75/721; 75/740; 75/743

(58) Field of Classification Search .............. 75/711, 75/721, 740, 743
See application file for complete search history.

(56) References Cited

U.S. PATENT DOCUMENTS

| | | |
|---|---|---|
| 3,753,691 A | 8/1973 | Grover et al. |
| 3,753,692 A | 8/1973 | Bourchier et al. |
| 3,796,787 A | 3/1974 | Burrows |
| 3,859,411 A | 1/1975 | Dubeck et al. |
| 4,093,526 A | 6/1978 | Blanco et al. |
| 4,150,976 A | 4/1979 | Dain |
| 5,480,620 A | 1/1996 | Cameron |
| 6,270,555 B1 | 8/2001 | Wood et al. |
| 6,280,501 B1 | 8/2001 | Ferron |
| 7,033,480 B2 | 4/2006 | King |
| 7,192,564 B2 | 3/2007 | Cardarelli et al. |
| 2004/0028585 A1 | 2/2004 | Cardarelli et al. |
| 2006/0117908 A1 | 6/2006 | Virnig et al. |

FOREIGN PATENT DOCUMENTS

JP    2007269550 A    *  10/2007

OTHER PUBLICATIONS

Abstract of JP 2007269550 A Oct. 2007.*
Machine translation of JP 2007269550 A.*
"Reference Document on Best Available Techniques for the Manufacture of Large Volume Inorganic Chemicals—Ammonia, Acids and Fertilisers," pp. 145 to 212, European Commission, Aug. 2007.
PCT/US08/85838 International Preliminary Examination Report issued Jul. 12, 2010.
Production by Contact Processes—pp. 325-332 date prior to 2006.

* cited by examiner

Primary Examiner — Jie Yang
(74) Attorney, Agent, or Firm — J.M. Robertson, LLC

(57) ABSTRACT

A system which uses available waste acid process streams from hydrometallurgical extraction processes as absorption media for the direct production of leach grade acid solutions for return to the hydrometallurgical processing circuit for use in liberating metals from metal-bearing materials. The produced acid may have a concentration in the range suitable for processing of metal-bearing materials.

16 Claims, 3 Drawing Sheets

PROCESS FOR LIBERATING METALS USING DIRECT PRODUCTION OF LEACH GRADE ACID SOLUTIONS

CROSS-REFERENCE TO RELATED APPLICATIONS

This application claims the benefit of, and priority from, U.S. Provisional Application 61/010,755 filed Jan. 11, 2008 and U.S. Provisional Application 61/060,872 filed Jun. 12, 2008. The contents of all such applications are hereby incorporated by reference in their entirety as if fully set forth herein.

TECHNICAL FIELD

The present invention relates generally to a process for treatment of metal-bearing materials using leach grade acid solutions, and more particularly, to a process utilizing sulfur trioxide and sulfur dioxide and reclaimed weak acid solutions from hydrometallurgical extraction processes to produce leach grade acid solutions for use in the treatment of metal-bearing materials to extract metal content therefrom.

BACKGROUND

A significant percentage of mining operations utilize hydrometallurgical treatments for processing metal-bearing materials such as ores, concentrates, and the like. Such processes typically involve the liberation of metal ions from the metal-bearing material using a leaching step in which the metal-bearing material is treated with an acid solution, either atmospherically or under elevated temperature and pressure conditions. As a result of the leaching process, metal ions are transferred to the acid thereby yielding a pregnant leach solution having an increased metal ion concentration. The pregnant leach solution may thereafter be subjected directly to a process such as cementation or the like to extract the metal content. Alternatively, the pregnant leach solution may be subjected to a solvent extraction process in which an organic solvent or extractant removes the metal from the pregnant leach solution. The loaded extractant is then mixed with an aqueous acid solution which strips the metal from the extractant thereby producing a solution stream with high metal concentration suitable for treatment in an electrowinning circuit or other subsequent treatment as may be desired to extract the concentrated and relatively pure metal. Of course, these general treatment procedures may be modified as desired depending upon the particular metal being extracted.

The hydrometallurgical processes which are typically utilized rely on the substantially continuous availability of sulfuric acid solution for use in the leaching step as well as in stripping the metal from any organic extractant as may be utilized. Such processes may also require the availability of acid to make up for losses in tank house solutions used in electrowinning circuits. The desired concentration levels for acid solutions used in these various processes is typically in the range of about 10 grams per liter acid to about 50% acid by weight. As will be appreciated, the various hydrometallurgical processes circulate large quantities of diluted acid solutions as a result of the various processing steps. These by-product acid streams typically have relatively dilute acid concentrations. Thus, hydrometallurgical processes used in metal extraction require the constant availability of fresh acid feedstock.

Historically, sulfuric acid solutions used in hydrometallurgical processing have been produced in acid plants providing acid at concentrations in the range of about 93% to about 98% acid. At lower acid concentrations (and at typical acid plant operating temperatures) the acid may become highly corrosive to metals, thereby giving rise to equipment and piping degradation. Due to the high concentration of the acid being produced, current acid plants are designed to operate under closely controlled temperature conditions. Moreover, such traditional acid plants must also operate substantially without the presence of moisture to avoid the generation of undesirable acid mists. Such stringent design criteria may give rise to substantial complexity in the design and operation of traditional acid plants.

As noted previously, in hydrometallurgical processing, it is often desirable to utilize relatively low concentration acid streams in the range of about 10 grams per liter acid to about 50% acid by weight. Within these ranges, the acid solutions provide effective leaching and solvent stripping characteristics while nonetheless being relatively non-corroding. In order to reach these desired concentrations, acids produced by typical prior processes are generally intentionally diluted by adding the acid to water.

BRIEF SUMMARY

The present invention provides advantages and alternatives over the prior practices by providing a system which uses available acid process streams from hydrometallurgical extraction processes as a feed material for the direct production of leach grade acid solutions for return to the hydrometallurgical processing circuit for use in liberating metals from metal-bearing materials. The produced acid may have a concentration in the potentially desirable range of about 5% to about 50% sulfuric acid suitable for processing of metal-bearing materials and/or use as make-up solutions for addition to the hydrometallurgical circuit.

In accordance with one aspect of a preferred embodiment, the present invention provides a process for utilizing a reclaimed weak acid solution from a hydrometallurgical process byproduct stream in combination with sulfur dioxide to produce a leach grade acid solution for use in extracting metal ions from a metal containing material as part of a metal extraction process.

In accordance with features of a potentially preferred embodiment, a first stream of aqueous sulfuric acid solution from a hydrometallurgical extraction process is provided. The aqueous acid solution may be a diluted leach solution, solvent extraction raffinate, lean electrowinning electrolyte or the like. A gas stream including sulfur dioxide is also provided. The majority of the sulfur dioxide is converted to sulfur trioxide in a catalytic converter. A portion of the sulfur trioxide is reacted with the aqueous sulfuric acid solution in an absorption reactor such that a leach grade acid solution of sulfuric acid is produced. The leach grade acid solution is contacted with a metal-bearing material to produce a pregnant leach solution having a metal content. The metal content is then extracted from the pregnant leach solution.

BRIEF DESCRIPTION OF THE DRAWINGS

Exemplary embodiments of the present invention will now be described by way of example only, with reference to the accompanying drawings which are incorporated in and which constitute a part of this specification herein and together with the general description of the intention given above, and the detailed description set forth below serve to explain the principles of the invention wherein.

While potentially preferred features of the invention have been illustrated and generally described above and will hereinafter be described in connection with potentially preferred embodiments and practices, it is to be understood that in no event is the invention limited to such illustrated and described embodiments and practices. On the contrary, it is intended that the present invention shall extend to all alternatives and modifications as may embrace the general principles of the invention within the full and true spirit and scope thereof.

DETAILED DESCRIPTION OF EXEMPLARY EMBODIMENTS

Figure 1:
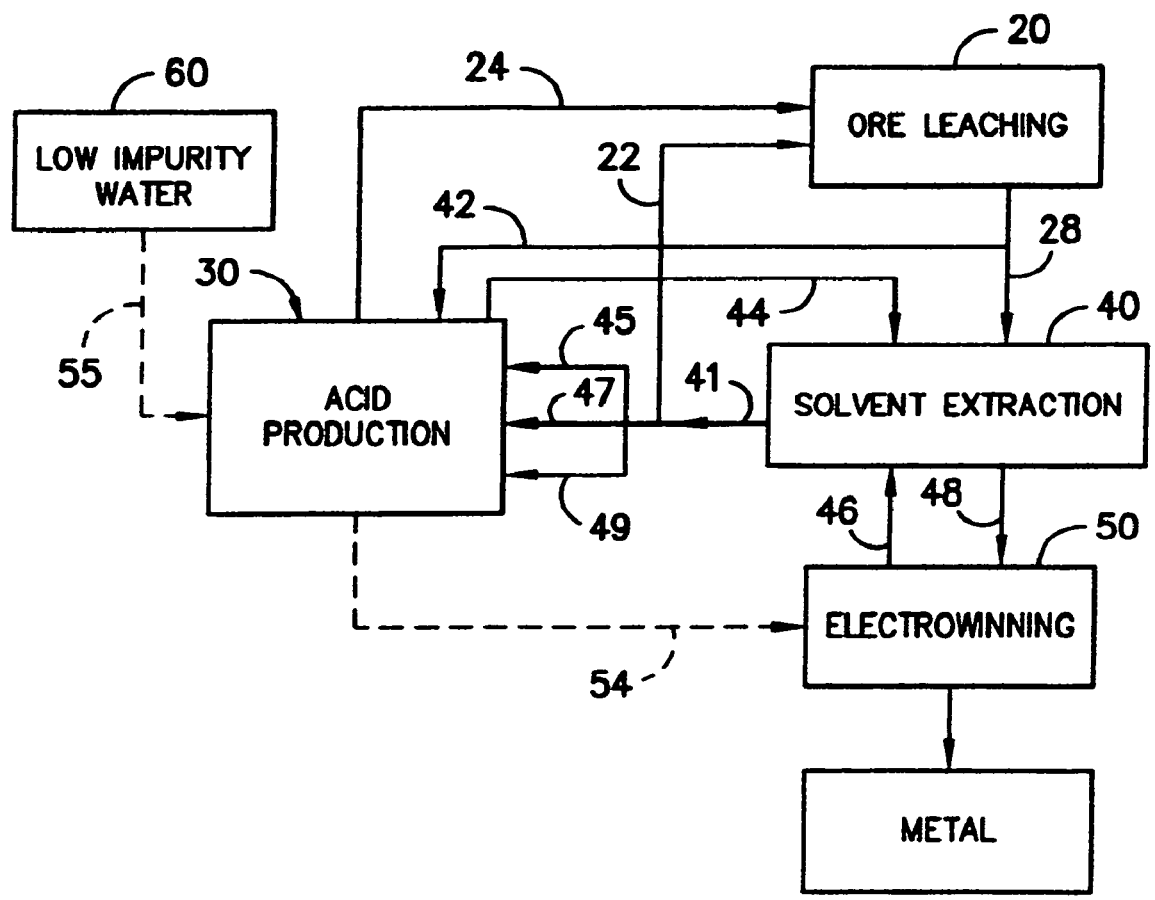
FIG. 1 is a simplified flow chart of an exemplary hydrometallurgical metal extraction circuit incorporating direct leach grade and low impurity acid production.

Reference will now be made to the drawings, wherein like elements are designated by like reference numerals in the various views. FIG. 1 schematically illustrates an exemplary hydrometallurgical extraction circuit consistent with the present disclosure. As shown, the exemplary metal production circuit begins with an ore leaching stage 20. By way of example only, and not limitation, this step may include an agglomerator, tanks, or heaps of ore. In this regard it is to be understood that the terms "ore" or "ore source" are intended to include without limitation any source of leachable metal-bearing material. By way of example only, and not limitation, typical ore sources may include directly mined ore, ore concentrates, recycled materials having leachable metal contents and the like.

According to the illustrated practice, the leaching stage 20 uses a recycled low acid solution 22 that is augmented in acid concentration by a generated acid stream of leach grade sulfuric acid 24. The leach grade sulfuric acid 24 is the product of an acid production operation 30 as will be described further hereinafter. In the exemplary process, metal values are leached from the ore into a pregnant leach solution stream 28 that reports to a solvent extraction process 40. It is contemplated that the acid production operation 30 may require cooling of product acid. In this exemplary embodiment, such cooling may be provided by a slip-stream 42 drawn from the pregnant leach solution stream 28. The pregnant leach solution forming the slip-stream 42 typically does not participate in any acid production reaction. Rather, it merely serves as a cooling medium by absorbing heat across a heat exchanger as may be utilized. The heated pregnant leach solution thereafter returns to the solvent extraction process 40 via a return stream 44. In many applications the heating of the pregnant leach solution may improve solvent extraction performance.

During the solvent extraction process 40, the pregnant leach solution is contacted with an organic extractant such that metal values are transferred to an organic phase extractant. Thereby yielding a metal loaded extractant and a stripped leach solution. The stripped leach solution exits the solvent extraction step as low-metal content raffinate stream 41. A portion of the raffinate stream 41 may form the recycled low acid solution 22 which is directed to ore leaching stage 20 as previously described. Another portion of the raffinate stream 41 reports to the acid production operation 30 for various uses as will be described further hereinafter. In this regard, a first portion of the raffinate stream 41 may form an $SO_3$ reaction feed stream 45 used to react with $SO_3$ and produce acid. A second portion of the raffinate stream 41 may form an $SO_2$ absorption stream 47 used downstream of an $SO_3$ absorber in the acid production operation 30 to absorb residual $SO_2$. Yet a third portion of the raffinate stream 41 may be used as a supplemental coolant source 49 in the acid production operation 30.

After stripping the metal content from pregnant leach solution stream 28, the metal-loaded organic extractant in the solvent extraction process 40 is mixed with an aqueous acid solution which strips the metal from the extractant to produce a concentrated metal-bearing stream 48. The concentrated metal-bearing stream 48 thereafter enters an electrowinning process 50 to extract metal content. By way of example only, the aqueous acid solution used in the stripping operation may be a lean electrolyte stream 46 from the electrowinning process 50 although other acid sources may also be utilized if desired.

The electrowinning process 50 is typically characterized by tank house electrolyte losses that are made up periodically by adding acid having relatively low levels of impurities. According to one contemplated practice, such tank house losses may be made up by a stream of low impurity acid 54 which may be selectively produced in the acid production process 30. In this regard, such low impurity acid 54 may be produced by simply substituting a low impurity water stream 55 for the raffinate stream 41. The low impurity water stream 55 may be provided by a well or other suitable low impurity water source 60 as may be available.

In practice, it is contemplated that the low impurity acid 54 is produced by absorbing $SO_3$ into the low impurity water stream 55. The $SO_3$ reacts with the water to produce the low impurity acid 54. This low impurity acid 54 may then be used to make up naturally occurring electrolyte losses in the electrowinning process 50 or for such other uses as may be desired. As an alternative to low impurity water, the low purity acid can be produced by directly absorbing $SO_3$ into a slip-stream of tank house electrolyte.

Figure 2:
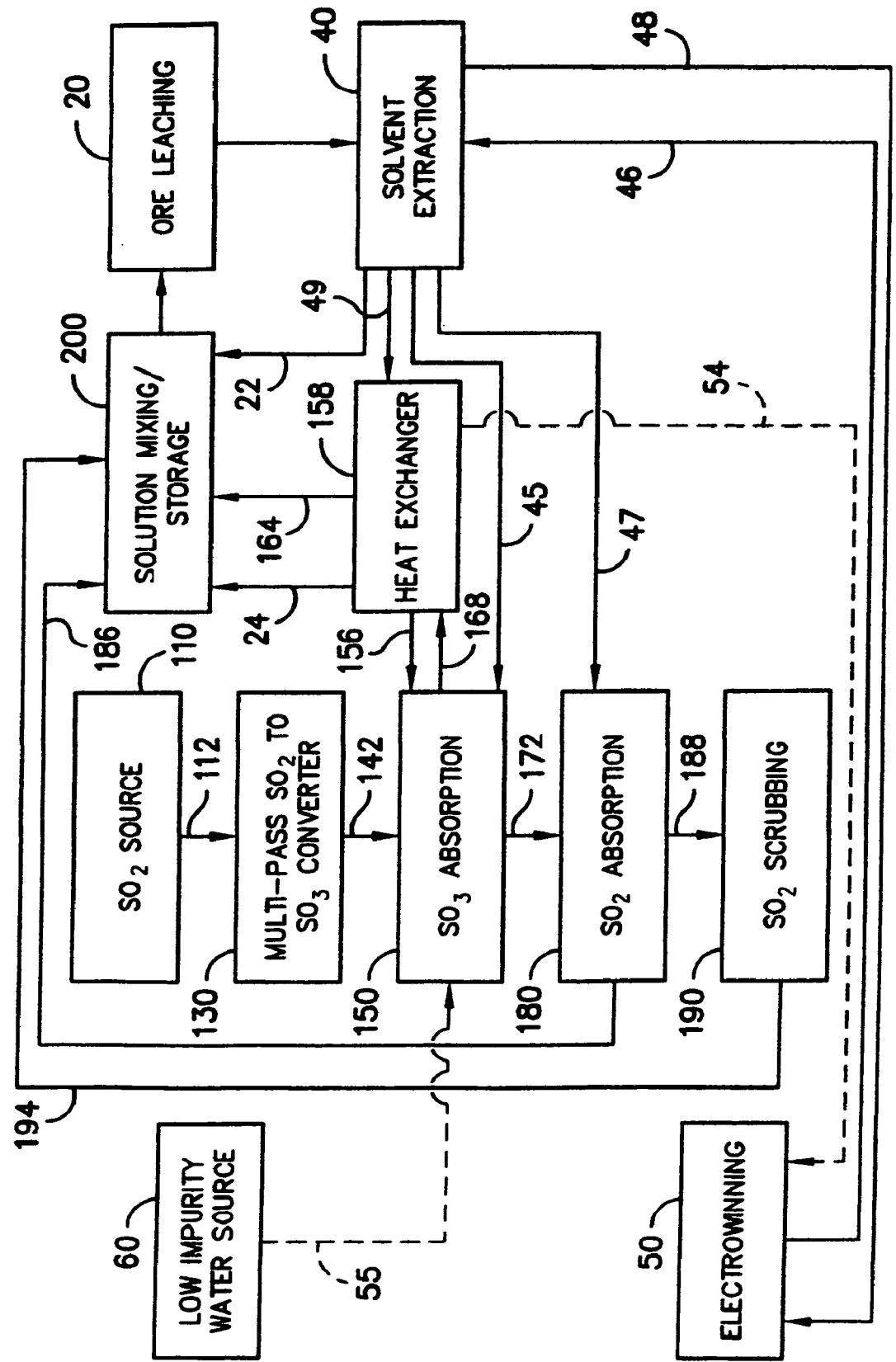
FIG. 2 is a flow chart illustrating steps in an exemplary process for the direct production of a leach grade acid solution and a low contaminant acid solution for operation in conjunction with metal extraction processes.
Figure 3:
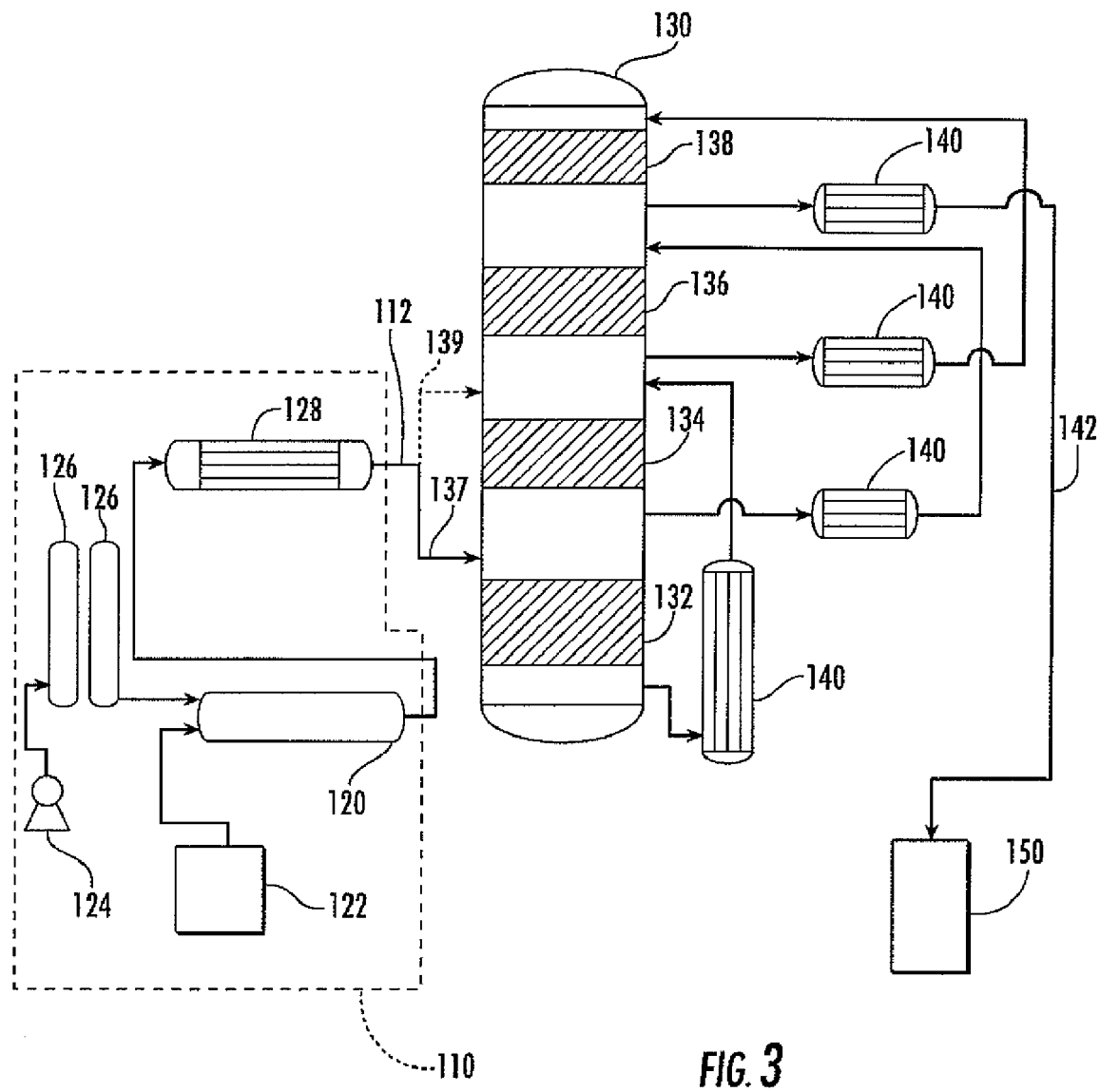
FIG. 3 illustrates an exemplary multi-pass converter system for conversion of $SO_2$ to $SO_3$ in the processes illustrated in FIG. 2.

Referring simultaneously to FIGS. 2 and 3, an exemplary process and related equipment are illustrated for the direct production of leach grade and low impurity acid using hydrometallurgical byproduct streams as part of the acid production operation 30. In accordance with the illustrated exemplary process, a sulfur dioxide ($SO_2$) source 110 produces an $SO_2$ gas stream 112. By way of example only, and not limitation, one contemplated $SO_2$ source 110 may include a sulfur furnace 120 as illustrated in FIG. 3, which is supplied with a feed stream of molten sulfur from a sulfur source 122. In sulfur furnace 120, the sulfur is burned with air provided by a furnace blower 124. If desired, the combustion air provided by furnace blower 124 may be passed through one or more regenerative air dryers to reduce the moisture content of the combustion air.

As the sulfur burns, $SO_2$ is produced. The $SO_2$ concentration in the $SO_2$ gas stream 112 is preferably about 10% by volume. However, it is contemplated that the process may also utilize gas streams with higher or lower $SO_2$ concentrations if desired. In this regard, it is contemplated that $SO_2$ concentration within the $SO_2$ gas stream 112 will preferably be not less than about 2% by volume and will more preferably be about 10% or greater by volume. Lower sulfur dioxide concentrations may be utilized but will require increasingly large handling systems due to the increased volume of gas being processed. In some instances, such increased sizing may be cost prohibitive. As will be appreciated, while the use of sulfur furnace 120 to produce an $SO_2$-bearing gas stream may be desirable, it is also contemplated that any number of alternative sources of $SO_2$ may be utilized. By way of example only, and not limitation, such sources may include gas streams produced by smelting of sulfur-bearing ores and other processes as may produce gas streams having sulfur dioxide concentrations suitable for processing.

According to a potentially preferred practice, the $SO_2$ gas stream may be passed through an $SO_2$ heat exchanger 128 to reduce the temperature prior to further processing. In this regard, it is to be understood that throughout this disclosure, the term "heat exchanger" is intended to include any process or equipment providing a desired adjustment to the temperature of a process stream. Accordingly, it is contemplated that $SO_2$ heat exchanger 128 may be of any suitable design as may be known to those of skill in the art for treatment of high temperature gaseous streams. By way of example only, and not limitation, it is contemplated that in smaller systems the $SO_2$ heat exchanger may be in the form of an air-to-gas heat exchange configuration while larger systems may utilize waste heat boiler designs. However, it is likewise contemplated that any number of other configurations may be utilized if desired. Regardless of the heat exchange arrangement utilized, it is contemplated that the $SO_2$ gas stream 112 will preferably be cooled to a level of about 750° Fahrenheit to about 800° Fahrenheit and most preferably about 780° Fahrenheit prior to undergoing further processing. However, higher or lower temperatures may likewise be utilized if desired.

The $SO_2$ gas stream 112 enters a multi-pass $SO_2$ to $SO_3$ converter 130 at a controlled temperature in the range of 750-800° F. As will be appreciated, the combustion of sulfur in the sulfur furnace 120 is a substantially exothermic process. Thus, the $SO_2$ gas stream produced by sulfur furnace 120 is at a substantially elevated temperature. According to the illustrated exemplary process, the temperature-adjusted $SO_2$ gas stream 112 is transported to a multi-pass catalytic converter 130 as will be well-known to those of skill in the art for conversion of $SO_2$ to $SO_3$. As illustrated in FIG. 3, it is contemplated that catalytic converter 130 may be a four pass converter including a first pass 132, a second pass 134, a third pass 136, and a fourth pass 138. However, it is likewise contemplated that the number of passes may be adjusted depending upon the desired level of conversion of $SO_2$ to $SO_3$. In this regard, while a multi-pass converter may be desirable in many applications, a single pass converter may also be used if desired. As will be appreciated by those of skill in the art, the conversion of $SO_2$ to $SO_3$ is thermodynamically favorable but is kinetically inhibited. Thus, each pass utilizes a catalyst such as vanadium pentoxide ($V_2O_5$) to promote the conversion. As illustrated, the catalytic converter 130 may be of an ascending ladder design in which the $SO_2$ gas stream 112 initially percolates through the first pass and is thereafter circulated to the subsequent passes. If desired, the temperature-adjusted $SO_2$ gas stream 112 may be delivered through selectively actuated feed legs 137, 139 which feed into the first and second passes respectively such that the first pass may be isolated if desired.

As will be appreciated by those of skill in the art, the catalytic conversion of $SO_2$ to $SO_3$ is highly exothermic thereby causing the temperature of the gas stream to increase after each pass. In this regard, it is contemplated that temperature of the gas stream following the first pass 132 will be approximately, 1,150° F. The temperature after second pass 134 will approach 1,000° F.; the temperature after third pass 136 will approach 900° F. The temperature after the fourth pass 138 will be in the range of 800° F. In order to reduce these temperatures, heat exchangers 140 may be used to reduce the temperature to a level of about 850° Fahrenheit or lower after each pass. By way of example only, and not limitation, such heat exchangers may include superheaters, air-to-gas heat exchangers, economizers and the like. In this regard, it is contemplated that the use of superheaters may be particularly desirable in many applications. Superheaters operate using steam as the cooling medium. Thus, by holding the steam in the superheaters above the acid dew point temperature of the gas streams being cooled, undesirable acid dew point corrosion is avoided. The elimination of acid dew point corrosion permits the use of construction materials having reduced corrosion resistance and correspondingly lower cost.

Following the final pass in the catalytic converter 130, the resultant $SO_3$ gas stream 142 is preferably characterized by an $SO_3$ concentration of about 5% to about 10% by volume. Residual $SO_2$ levels are expected to be in the range of 1,000-2,000 ppm (parts per million) by volume. As shown, this $SO_3$ gas stream 142 is thereafter transferred to an $SO_3$ absorber 150 for absorptive treatment with a weak acid $SO_3$ reaction feed stream 45 or low impurity water stream 54 as previously described. The temperature of the $SO_3$ gas stream 142 entering the $SO_3$ absorber 150 is preferably about 500-700° Fahrenheit.

The $SO_3$ absorber 150 may be of the type typically used to quench process gases in a metallurgical facility such as those used to treat copper smelter off-gases downstream of a hot electrostatic precipitator and upstream of a traditional acid plant. The design of the $SO_3$ absorber 150 typically incorporates design criteria that result in an absorber of lower cost than the absorption towers used in traditional acid plant designs. Exemplary $SO_3$ absorbers are believed to be available from the Chemithon Enterprises Inc. having a place of business at 5430 West Marginal Way SW in Seattle, Wash.

In accordance with one contemplated practice, within the $SO_3$ absorber 150, the $SO_3$ gas stream 142 is contacted by the weak acid $SO_3$ reaction feed stream 45 as well as by a cooled recirculating acid stream 156. According to a potentially preferred practice, the weak acid $SO_3$ reaction feed stream 45 may be an aqueous acid solution derived from one or more recycling streams flowing around hydrometallurgical operations. Thus, although byproduct raffinate solutions reclaimed from solvent extraction processes may be particularly desirable, other available supply sources may also be used. By way of example only, and not limitation, such alternative sources may include byproduct lean leach solutions reclaimed from prior leaching operations, lean electrolyte solutions reclaimed from a prior electrowinning processes and similar reclaimed or virgin acid solutions used alone or in combination with one another. Such weak acid solutions are preferably characterized by acid concentrations not greater than about 200 grams per liter of sulfuric acid and will more preferably be characterized by acid concentrations in the range of about 2 to about 60 grams per liter of sulfuric acid. Weak acid solutions characterized by acid concentrations in the range of about 3 to about 10 grams per liter of sulfuric acid may be particularly preferred. However, it is contemplated that higher or lower acid concentrations may likewise be utilized. As will be appreciated, the use of such weak acid solutions produced by hydrometallurgical processing represents a substantial distinction from traditional acid production wherein $SO_3$ absorption typically utilizes relatively high concentration and high purity sulfuric acid as the absorption solution.

Within the $SO_3$ absorber 150, the weak acid $SO_3$ reaction feed stream 45 and the cooled recirculating acid stream 156 react with $SO_3$ gas stream 142 primarily according to the following reaction to produce an enhanced concentration acid stream 168.

$$SO_3 + H_2O \rightarrow H_2SO_4$$

During conventional acid production, where the absorbing solution is high (>95%) concentration sulfuric acid, the production of acid is acknowledged as a two-step reaction as shown below. To a lesser effect, these reactions may also occur within $SO_3$ absorber 150.

$$H_2SO_4 + SO_3 \rightarrow H_2S_2O_7$$

$$H_2S_2O_7 + H_2O \rightarrow 2H_2SO_4$$

It is contemplated that the flow rate of weak acid $SO_3$ reaction feed stream 45 and cooled recirculating acid stream 156 should be in the range of about 2 to 3 gallons per minute for each ton per day of desired acid production capacity. However, such levels may be greater or lower depending upon the acid concentration in the weak acid $SO_3$ reaction feed stream 45 and depending on maintaining of the tower temperature in a range to avoid significant formation of acid mist. According to a potentially preferred practice, it may be desired to provide the weak acid $SO_3$ reaction feed stream 45 at a level so as to provide adequate quenching to maintain operating temperatures within the $SO_3$ absorber 150 at levels in the range of about 140° Fahrenheit to about 180° Fahrenheit. It is contemplated that such temperature levels may reduce the propensity for excessive acid mist formation.

In order to promote temperature control and to provide increasing acid concentration levels, the enhanced concentration acid stream 168 may be recycled through a heat exchanger 158 so as to provide multiple treatment cycles. In accordance with a potentially preferred aspect, the heat exchanger 158 may be cooled by the raffinate feed stream 49 from the solvent extraction process 40 as previously described. Of course, other cooling media may likewise be used. By way of example only, and not limitation, such cooling media may include waste water from mining operations, stripped leach solutions and the like. Of course, other cooling sources such as well water and the like may also be utilized if desired. As discussed earlier, pregnant leach solution can also be used for cooling. The heated water or raffinate stream 164 exiting the heat exchanger 158 may thereafter be sent to a solution mixing and storage site 200 for blending with other acid and/or aqueous sources for subsequent recycling to the leaching stage 20. Alternatively, such heated water or raffinate stream 164 may be delivered directly to a heap leaching site or the like where enhanced temperature may be used to facilitate the transfer of metal ions from metal bearing material into the water or raffinate solution for subsequent recovery by the solvent extraction process 40 or other suitable metal extraction processes as may be utilized.

As indicated, according to a potentially preferred practice, a portion of the enhanced concentration acid stream 168 may be recycled from heat exchanger 158 back to the $SO_3$ absorber 150 in the form of the cooled recirculating acid stream 156 to provide temperature and concentration control. Once steady state conditions are reached, the leach grade sulfuric acid solution 24 can be bled off and sent to the solution mixing and storage site 200 for blending with other acid and/or aqueous sources for subsequent delivery to leaching stage 20 to leach metal from metal-bearing material as previously described in relation to FIG. 1. Alternatively, the leach grade sulfuric acid solution 24 may be delivered directly to leaching stage 20 if desired.

By way of example only, a typical ore leaching process may include one or more agglomerators in which materials having enhanced metal concentrations such as high grade ore, concentrates and the like may be reacted with the leach grade sulfuric acid solution 24 to leach metals from the material for subsequent metal extraction. In order to promote efficient ore processing, while at the same time allowing the use of non-metallic materials of construction for piping and handling the leach grade acid, it is contemplated that the leach grade sulfuric acid solution 24 will preferably have an acid concentration in the range of about 5% to about 50% by weight. Higher concentrations up to about 70% are possible but higher cost materials of construction may be required to ensure compatibility between equipment and piping and the higher concentration acid. It is contemplated that such levels may be readily adjusted by manipulation of the recycling percentage which affects the acid concentration.

In accordance with a contemplated practice, downstream of the $SO_3$ absorber 150, a gas stream flow 172, enters an $SO_2$ absorber 180 where a portion of the remaining $SO_2$ is absorbed. A portion of this sulfur dioxide is removed at the $SO_2$ absorber 180 as an off gas stream. As shown, at the $SO_2$ absorber 180, the gas stream flow 172 contacts the $SO_2$ absorption stream 47 such as raffinate from the solvent extraction process 40 or other suitable weak acid solution as may be available. In this regard, the $SO_2$ absorption stream 47 may be drawn from the same reclaimed weak acid solution source utilized to supply the $SO_3$ absorber 150. However, alternative weak acid solution sources may likewise be utilized if desired.

In the illustrated practice, the $SO_2$ absorber 180 yields an $SO_2$-bearing weak acid stream 186. This $SO_2$-bearing weak acid stream 186 may thereafter be utilized either alone or in combination with other generated process streams for ore leaching to yield a pregnant leach solution or other procedures to extract metal content. As will be recognized by those of skill in the art, the addition of $SO_2$ to an acid process stream may substantially aid in leach processing. This phenomenon is well documented in the literature and forms no part of the present invention. However, the generation of $SO_2$-bearing weak acid stream 186 as a byproduct of acid production using a reclaimed weak acid solution as the absorption media is believed to be unique.

A gas stream 188 from the $SO_2$ absorber 180 may thereafter be sent to a scrubbing unit 190 for combination with scrubbing reagents such as sodium hydroxide or the like to generate a liquid scrubber product 194. Such scrubber products can thereafter be processed in manners consistent with industry practice. For the case of sodium hydroxide scrubbing, the liquid scrubber product 194 may be added directly to the mine leach solutions. The scrubber off-gas will be further processed to reduce acid mist levels to ensure that final discharge gases meet local environmental standards for both $SO_2$ and acid mist. The acid mist that is captured can be added to the recycle leg of the $SO_3$ absorber 150 or be directed to another application if desired.

As will be appreciated, this disclosure has described several potential uses for recycled low acid mine solutions such as raffinate or the like. In addition to these uses of mine solutions, a portion of the available recirculating solution such as raffinate from solvent extraction process 40 may flow directly into the solution mixing and storage site 200 such as a raffinate pond or the like. As previously noted, such a solution mixing and storage site 200 can also receive flows from $SO_2$ scrubbing operation 190 and other miscellaneous bleed streams that are produced.

As will be appreciated from the foregoing discussion, the present invention provides leach grade acid solutions and $SO_2$-bearing acid solutions for use in ore processing while making use of weak acid solutions reclaimed from hydrometallurgical processes as the absorption media in the acid production process. While leach grade sulfuric acid solution 24 and $SO_2$-bearing weak acid stream 186 produced using a reclaimed weak acid source are highly suitable for direct ore processing as part of a metal extraction process, it will be recognized that such solutions may nonetheless have concentrations of impurities which limit their use in other applications. By way of example only, such solutions may not be suitable for use as make-up solutions for addition to electrolytic tank houses or other high purity environments. To address such deficiencies arising due to contamination, the exemplary process illustrated in FIG. 2 further provides the ability to produce a low impurity acid.

As shown, according to the exemplary process, the system may be selectively adjusted to switch to the production of high purity acid by activating the flow streams shown in dashed format. Specifically, a low impurity water stream 55 may be selectively delivered to the $SO_3$ absorber 150 in substitution for raffinate or other $SO_3$ reaction feed stream 45 from the hydrometallurgical circuit. Such a low impurity water stream 55 may be provided by a well or other low impurity water source 60 as may be available. The $SO_3$ reaction process may thereafter be carried out as previously described. The resulting product is cooled low impurity acid 54 which may be delivered to the electrowinning process 50 as needed or for such other purposes as may be desired.

As will be understood, the present invention provides a method for producing and utilizing acid solutions for purposes of leaching metals from metal-bearing materials as part of a metal extraction process. The process may utilize a feed stream of weak acid solution as the absorption media in the acid production process. Such a weak acid solution may include leach solutions, aqueous raffinate, or lean electrolyte reclaimed from hydrometallurgical metal extraction procedures. The process may also include an optional leg for the production of low contaminate acid solutions. Such processes may find substantial utilization in any number of metal extraction environments. By way of example only, and not limitation, such techniques may be useful in the extraction of copper, nickel, gold, silver, uranium, and virtually any other metal system adaptable to recovery following leach extraction.

The present invention has been described above with reference to a number of exemplary embodiments. However, it should be appreciated that the particular embodiments shown and described herein are illustrative only and in no way intended to limit the scope of the invention. Thus those skilled in the art having read this disclosure will recognize that changes and modifications may be made to the exemplary embodiments without departing from the spirit and scope of the present invention. Accordingly, all such changes and modifications are intended to be included within the scope of the present invention.

All references, including publications, patent applications, and patents, cited herein are hereby incorporated by reference to the same extent as if each reference were individually and specifically indicated to be incorporated by reference and were set forth in its entirety herein. The use of the terms "a" and "an" and "the" and similar referents in the context of describing the invention are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any element as essential to the practice of the invention. All percentages are by weight unless otherwise indicated.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter disclosed herein as permitted by applicable law. Moreover, any combination of the above-described elements in all possible variations thereof is encompassed by the invention unless otherwise indicated herein or otherwise clearly contradicted by context.

What is claimed is:

1. A process for metal recovery, the process comprising the steps of:
    (a) drawing a first stream of aqueous sulfuric acid solution from a hydrometallurgical extraction circuit including a solvent extraction stage in series with and an electrowinning stage, said first stream of aqueous sulfuric acid solution comprising a process fluid normally used in the hydrometallurgical extraction circuit and selected from the group consisting of leach solution, solvent extraction raffinate, electrowinning electrolyte and combinations thereof;
    (b) providing a gas stream comprising sulfur dioxide;
    (c) converting a first portion of said sulfur dioxide to sulfur trioxide in a catalytic converter;
    (d) reacting a first portion of said sulfur trioxide with at least a portion of said first stream of aqueous sulfuric acid solution by absorptive contact reaction in a sulfur trioxide absorption unit in fluid communication with a heat exchanger to produce a leach grade acid solution wherein during this reacting step an enhanced concentration acid stream is withdrawn from the sulfur trioxide absorption unit and is recirculated through the heat exchanger for cooling and back to the absorption unit in a circulation loop to produce a controlled target acid concentration for said leach grade acid solution of not less than about 5% to 50% by weight sulfuric acid;
    (e) introducing at least a portion of said leach grade acid solution back to said hydrometallurgical extraction circuit for contact with a metal bearing material to yield a pregnant solution having a metal content; and
    (f) extracting at least a portion of said metal content from said pregnant solution.

2. The process as recited in claim 1, wherein the heat exchanger is cooled by an aqueous solvent extraction raffinate solution stream independent from said first stream of aqueous sulfuric acid solution to produce a heated aqueous solvent extraction raffinate solution.

3. The process as recited in claim 2, wherein the heated aqueous solvent extraction raffinate solution is delivered to a leaching process.

4. The process as recited in claim 1 wherein said catalytic converter is a multi-pass catalytic converter.

5. The process as recited in claim 4, wherein said multi-pass catalytic converter is a four pass converter.

6. The process as recited in claim 1, wherein said aqueous sulfuric acid solution is characterized by an acid concentration of not greater than about 60 grams per liter.

7. The process as recited in claim 1, wherein said leach grade acid solution comprises about 5% to about 50% by weight sulfuric acid.

8. The process as recited in claim 1, wherein said gas stream comprises not less than about 2% by volume of sulfur dioxide.

9. The process as recited in claim 1, comprising the further steps of absorbing a second portion of said sulfur dioxide into a second stream of aqueous sulfuric acid solution recovered from the hydrometallurgical extraction circuit to produce an $SO_2$-bearing acid solution, and delivering said $SO_2$-bearing acid solution to an ore leaching process, said second stream of aqueous sulfuric acid solution selected from the group consisting of leach solution, solvent extraction raffinate, electrowinning electrolyte and combinations thereof.

10. A process for metal recovery, the process comprising the steps of:
(a) drawing a first stream of aqueous sulfuric acid solution from a hydrometallurgical extraction circuit treating a metal bearing material, the hydrometallurgical extraction circuit including ore leaching, solvent extraction and electrowinning stages arranged in series, said first stream of aqueous sulfuric acid solution comprising a process fluid normally used in the hydrometallurgical extraction circuit and selected from the group consisting of leach solution, solvent extraction raffinate, electrowinning electrolyte and combinations thereof having a sulfuric acid concentration in the range of 3 to 10 grams per liter;
(b) providing a gas stream comprising sulfur dioxide;
(c) converting a first portion of said sulfur dioxide to sulfur trioxide in a catalytic converter;
(d) reacting a first portion of said sulfur trioxide with at least a portion of said first stream of aqueous sulfuric acid solution by absorptive contact reaction in a sulfur trioxide absorption unit in fluid communication with a heat exchanger to produce a leach grade acid solution wherein during this reacting step an enhanced concentration acid stream is withdrawn from the sulfur trioxide absorption unit and is recirculated through the heat exchanger for cooling and back to the absorption unit in a circulation loop to produce a controlled target acid concentration for said leach grade acid solution of not less than about 5% to 50% by weight sulfuric acid;
(e) introducing at least a portion of said leach grade acid solution back to said hydrometallurgical extraction circuit within at least one of the ore leaching stage and the solvent extraction stage to yield a pregnant solution having a metal content; and
(f) extracting at least a portion of said metal content from said pregnant solution.

11. The process as recited in claim 10, wherein the heat exchanger is cooled by an aqueous solvent extraction raffinate solution stream independent from said first stream of aqueous sulfuric acid solution to produce a heated aqueous solvent extraction raffinate solution.

12. The process as recited in claim 11, wherein the heated aqueous solvent extraction raffinate solution is delivered to a leaching process.

13. The process as recited in claim 10, wherein said catalytic converter is a multi-pass catalytic converter.

14. The process as recited in claim 13, wherein said multi-pass catalytic converter is a four pass converter.

15. The process as recited in claim 10, wherein said gas stream comprises not less than about 2% by volume of sulfur dioxide.

16. A process for production of leach grade sulfuric acid, the process comprising the steps of:
(a) drawing a first stream of aqueous sulfuric acid solution from a hydrometallurgical extraction circuit including a solvent extraction stage in series with and an electrowinning stage, said first stream of aqueous sulfuric acid solution comprising a process fluid normally used in the hydrometallurgical extraction circuit and selected from the group consisting of leach solution, solvent extraction raffinate, electrowinning electrolyte and combinations thereof having a sulfuric acid concentration in the range of 3 to 10 grams per liter;
(b) providing a gas stream comprising sulfur dioxide;
(c) converting said sulfur dioxide to sulfur trioxide in a catalytic converter to yield a modified gas stream comprising about 5% to about 10% by volume sulfur trioxide and not more than about 2000 ppm by volume residual sulfur dioxide; and
(d) reacting said modified gas stream with at least a portion of said first stream of aqueous sulfuric acid solution by absorptive contact reaction in a sulfur trioxide absorption unit in fluid communication with a heat exchanger to produce a leach grade acid solution wherein during this reacting step an enhanced concentration acid stream is withdrawn from the sulfur trioxide absorption unit and is recirculated through the heat exchanger for cooling and back to the absorption unit in a circulation loop to produce a controlled target acid concentration for said leach grade acid solution of not less than about 5% to 50% by weight sulfuric acid.

* * * * *